United States Patent
Kernick et al.

[15] 3,636,430
[45] Jan. 18, 1972

[54] ANTICIPATORY FEEDBACK CONTROL FOR INVERTERS

[72] Inventors: Andress Kernick; Manvel A. Geyer, both of Lima; Glenn W. Ernsberger, Worthington; John F. Vonderembse, Lima, all of Ohio

[73] Assignee: Westinghouse Electric Corporation, Pittsburgh, Pa.

[22] Filed: Oct. 26, 1970

[21] Appl. No.: 83,958

[52] U.S. Cl. ............................321/9 A, 321/18, 321/45 R
[51] Int. Cl. ............................H02m 1/12, H02m 7/52
[58] Field of Search ...................321/9, 9 A, 16, 18, 45 R; 330/10; 332/14

[56] References Cited

UNITED STATES PATENTS

| | | | |
|---|---|---|---|
| 3,214,672 | 10/1965 | Watkins | 321/16 |
| 3,310,730 | 3/1967 | Ruch | 321/9 A |
| 3,360,709 | 12/1967 | Etter | 321/18 X |
| 3,445,742 | 5/1969 | Moscardi | 321/9 A |

FOREIGN PATENTS OR APPLICATIONS

| | | | |
|---|---|---|---|
| 1,048,682 | 11/1966 | Great Britain | 321/9 A |
| 1,230,489 | 12/1966 | Germany | 321/9 A |

Primary Examiner—William H. Beha, Jr.
Attorney—F. H. Henson, C. F. Renz and M. P. Lynch

[57] ABSTRACT

The invention comprises apparatus for comparing the filtered power transformer output waveform of a pulse-width-modulated inverter circuit with an AC reference voltage waveform and generating output voltage signals to control the inverter drive circuit to the extent necessary to produce an inverter output waveform substantially duplicating the reference voltage waveform and substantially void of low order harmonics. An anticipatory signal developed by a circuit which monitors the change in current with respect to time in a capacitor included in a filter circuit connected to the output of the power transformers provides optimum response of the apparatus to changes in the output waveform beyond prescribed units relative to the reference voltage waveform.

5 Claims, 5 Drawing Figures

FIG. I 3,636,430

ANTICIPATORY FEEDBACK CONTROL FOR INVERTERS

RELATED APPLICATION

This application is related to application Ser. No. 14,314 titled Apparatus For Reducing a Low Distortion Pulse Width Modulated Inverter Output, filed Feb. 26, 1970 and assigned to the assignee of this invention.

BACKGROUND OF THE INVENTION

The above-identified related application disclosed the use of a voltage feedback signal from the output of an inverter power transformer for comparison with a reference AC signal as a technique for controlling the firing of inverter switches to develop an AC inverter output waveform which approximates the AC reference waveform within prescribed limits while the above-disclosed invention provides compensation for transport lag in the AC inverter output waveform caused by storage time on nonideal inverter switching elements, the voltage feedback does not provide optimum anticipation of excursions of the AC inverter output waveform beyond the limits developed about the AC reference waveform.

SUMMARY OF THE INVENTION

This disclosure defines an improved technique for providing anticipation of excursions of the AC inverter output waveform. A circuit is utilized which monitors change in current with respect to time in a filter circuit associated with the output of the inverter power transformer. The change in current provides optimum anticipation of voltage excursions and a signal corresponding to this current change is applied to the inverter control circuit to minimize AC inverter output voltage excursions beyond the prescribed limits defined about the AC reference waveform.

DESCRIPTION OF THE PREFERRED EMBODIMENT

Figure 1:
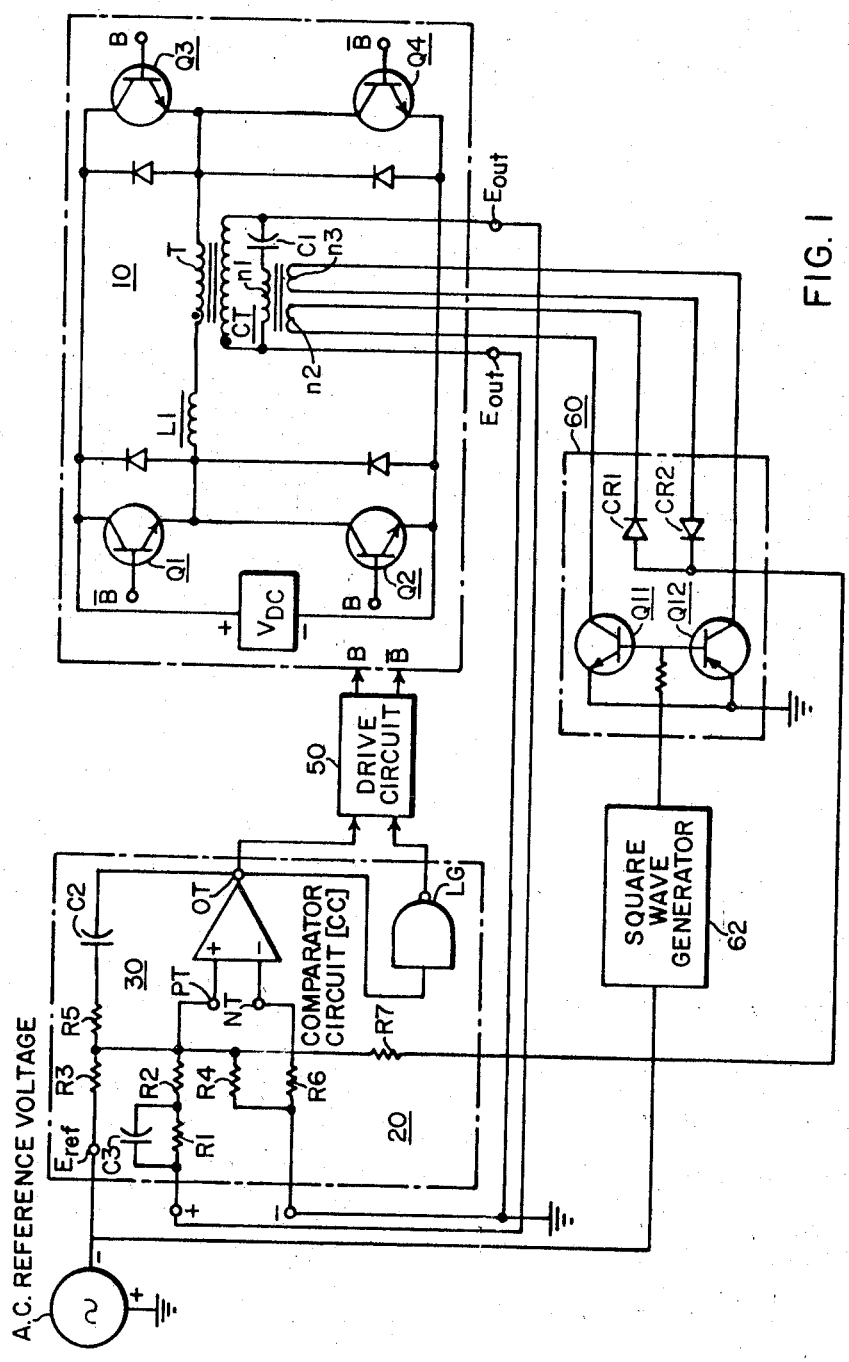
FIG. 1 is a schematic illustration of the preferred embodiment.

Referring to FIG. 1 there is illustrated schematically a typical inverter bridge power stage 10 including power switches Q1, Q2, Q3, and Q4, a DC voltage source $V_{DC}$, and a power switch conduction control circuit 20 for generating power switch gating signals B and $\bar{B}$. The inverter circuit output voltage, $E_{out}$, appearing across the inverter output transformer T is developed by the controlled alternate conduction of the power switch pairs Q1 and Q4, and Q2 and Q3. The resulting pulse-width-modulated pulse pattern is filtered by the choke L1 and the capacitor C1 to produce an harmonically neutralized output waveform, typically a sine wave.

The control circuit 20 operates to minimize distortion of the inverter output voltage $E_{out}$ by controlling the conduction of the inverter power switches Q1 through Q4 as a function of the divergence of the inverter output voltage from a reference voltage of controlled magnitude and frequency. The control circuit 20 in essence imparts a random gating of the inverter switch pairs through a drive circuit 50 in response to a preset variance of the magnitude of the inverter output voltage waveform from the reference voltage waveform and in so doing essentially forces the inverter output to duplicate the reference voltage waveform. The frequency of the AC reference corresponds to the desired inverter output frequency.

Figure 2:
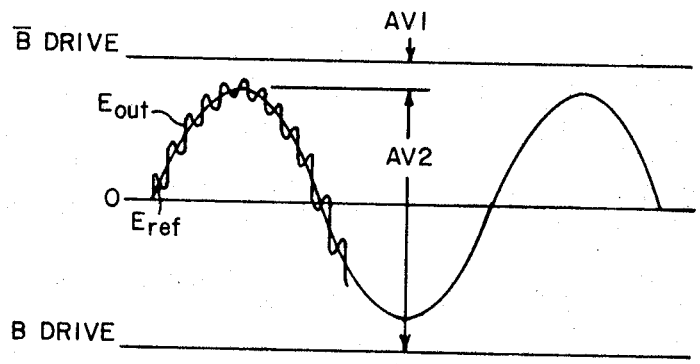
FIGS. 2 and 3 are representations of wave shapes illustrating the operation of the embodiment of FIG. 1.
Figure 3:
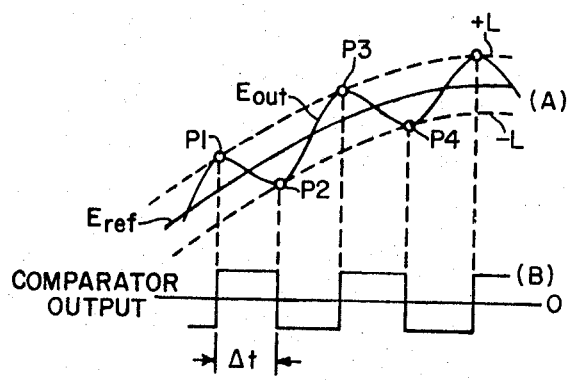

The control circuit 20 includes a comparator circuit CC having a positive input terminal PT, a negative input terminal NT, a positive feedback circuit 40 and an output terminal OT. The filtered inverter output voltage $E_{out}$, the AC reference voltage $E_{ref}$ produced by AC voltage source 30, and a feedback signal from the feedback circuit 40 are combined and applied to the comparator circuit input terminal PT through an input resistor network comprises of resistor R1, R2, R3, and R5. The comparator circuit CC operation is illustrated by the waveforms of FIGS. 2 and 3. Inverter output waveform $E_{out}$ is illustrated as an AC waveform containing distortion and transients whereas the AC reference waveform $E_{ref}$ is illustrated as an AC waveform exhibiting essentially zero distortion and free of a DC component. The variation of the inverter output voltage $E_{out}$ beyond preset limits +L and −L relative to the AC reference voltage, as illustrated in waveform 3A, results in the generation of comparator circuit plus and minus output voltage signals as illustrated in waveform 3B, which corresponds to points P1, P2, P3, P4,...of waveform 3A. The comparator circuit output voltage signals, in the form of drive signals B and $\bar{B}$ from the drive circuit 50, control the gating of the inverter power switches Q1 through Q4 to maintain the inverter output voltage $E_{out}$ within the limits +L and −L. The application of the B and $\bar{B}$ drive signals by the drive circuit 50 for gating the power switches Q1 to Q4 may be typically accomplished according to the teachings of U.S. Pat. No. 3,412,316 issued to the inventor on Nov. 19, 1968 and assigned to the assignee of the present invention.

The feedback circuit 40, which comprises capacitor C2 and a divider network including resistors R4 and R5, functions to apply a portion of the comparator circuit output signal to the positive input terminal PT.

The limits +L and −L are established by the resistors R4 and R5 of the feedback circuit 40. An inherent hysteresis, or error band region, is defined by the limits +L and −L relative to the AC reference voltage $E_{ref}$. This hysteresis provides a finite time interval, $\Delta t$, between the successive switching instants P1, P2, P3, P4...of the power switches Q1 to Q4 by the B drive outputs as illustrated in FIG. 3. For a proper selection of the components of the feedback circuit 40, the value of the limits +L and −L and consequently the finite time interval $\Delta t$, can be altered so as to equal or exceed the storage time of the power switches and thus enable the gating pulses applied to the inverter power switches to drive the power switches into saturation thereby minimizing the forward drop loss of the power switches and preventing loss of "feathering" of a power switch gate pulse. When the finite time interval $\Delta t$ is greater than the power switch storage time there is no significant inverter output waveform distortion produced by nominal gate pulse transport lag.

The capacitor C2 of the feedback circuit 40 effectively isolates the input terminal PT from any average DC voltage which may be present at the output terminal OT of the comparator circuit CC.

The operation of the control circuit 20 in generating the drive signals B and $\bar{B}$ is the same regardless of the polarity of the inverter output $E_{out}$. There is no requirement for logic flip-flop generally included in inverter circuits to account for changes in the inverter output polarity.

The output of the comparator circuit CC changes between B and $\bar{B}$ as the net difference between the inverter output $E_{out}$ and the AC reference $E_{ref}$ exceeds the value of the appropriate limit, either +L or −L, established by the resistors R4 and R5.

The comparator circuit CC produces a positive output signal where a net positive signal exists at the positive input terminal PT as a result of the combination of a signal proportional to the inverter output voltage $E_{out}$, a signal proportional to the AC reference voltage $E_{ref}$ and a signal proportional to the preset limit −L which is established by the feedback circuit 40. An output signal is manifested by the $\bar{B}$ drive signal from the logic NAND-gate LG, which through the operation of drive circuit 50, gates power switches Q1 and Q4 into a state of conduction in order to return the inverter output voltage $E_{out}$ within the preset limits +L and −L. Conversely, the comparator circuit CC output signal becomes negative when a net negative signal exists at the comparator circuit input terminal PT as a result of the combination of the signal proportional to the inverter output voltage $E_{out}$, a signal proportional to the AC reference voltage $E_{ref}$ and a signal proportional to the preset limit +L which is established by the feedback circuit 40. This comparator circuit output signal is manifested by a B drive signal from the comparator circuit CC. The B drive signal functions to gate the power switches Q2 and Q3 to a state of conduction to reverse the positive trend of the inverter output voltage $E_{out}$ and return the output voltage within the preset limits +L and −L. In the case of a B drive signal that provides compensation for an inverter output voltage $E_{out}$ which exceeds the limit +L the feedback circuit 40 functions to maintain the corrective effect of the positive B drive signal until the inverter output voltage $E_{out}$ reaches the negative limit −L. Conversely in the event of a $\overline{B}$ drive signal from a comparator circuit CC, the feedback circuit functions to maintain the corrective effect of the $\overline{B}$ drive signal until the inverter output voltage $E_{out}$ reaches the +L limit.

The relationship of the B and $\overline{B}$ power switch drive signals and the voltage waveforms $E_{ref}$ and $E_{out}$ is illustrated in FIG. 2. It is apparent from FIG. 2 that the B drive signal is capable of effecting a high rate of change in the inverter output voltage $E_{out}$ as the difference $\Delta V1$ between the $\overline{B}$ drive signal and the waveform $E_{out}$ becomes small and the difference $\Delta V2$ becomes large. Conversely the $\overline{B}$ drive is capable of effecting the much high rate of change in the inverter output voltage as $\Delta V1$ becomes large.

Due to the high rate of change of the inverter output voltage it is desirable to provide circuit anticipation of large voltage changes in order to prevent excursions beyond the limits +L and −L. This anticipatory operation is provided by anticipation circuit 60 which monitors the change in current in output filter capacitor C1 with respect to time and supplies an anticipatory control signal to input terminal PT of comparator circuit CC. The monitoring of current change provides an indication of change in the AC inverter output voltage waveform before the voltage change actually occurs. The change in current through the capacitor C1 is monitored by current transformer CT windings n1, n2, and 3. The current transformer CT functions also as an inductive filter element in the output circuit of the transformer T. The current changes in the AC inverter waveform half cycles are coupled from winding n1 by windings n2 and n3 to the anticipation circuit 60. Anticipation circuit 60 is comprised of a synchronous demodulated combination of transistor switches Q11 and Q12 with base bias signal supplied by the output of square wave generator 62, diodes CR1 and CR2, and output signal resistor R7. Square wave generator 62 converts the AC reference waveform into a square wave output which is out of phase with the reference waveform.

During the positive excursion of the AC reference voltage the square wave generator 62 generates a square wave output which is of opposite phase and which turns transistor Q12 on. The positive half-cycle of the inverter 10 is also generated. During the positive half-cycle of inverter output voltage, especially near peak voltage, the diminished capability ($\Delta V$) to boost output voltage results in a small changing current of polarity of end-opposite-dot positive in current transformer CT. Any voltage induced in the current transformer CT during this capacitor charging is blocked by diode CR2 and transistor Q11. However when a change to $\overline{B}$ drive occurs, this drive results in a relatively large current being drawn from capacitor C1 with dot-end positive on current transformer CT. This pulse of current is transmitted through transistor Q12 and diode CR2 to resistor R7 and applied to the input PT of comparator circuit CC to adjust the DC level of the AC reference. The adjustment of AC reference causes an early, anticipatory return to the B drive in order to avoid over compensation by the $\overline{B}$ drive.

In the negative half cycle of the AC reference and the inverter output the transistor Q11 is turned on and transistor Q12 turned off, and a like mode of operation to that of the positive half cycle occurs to yield anticipation of over compensation by the B drive.

The magnitudes of B and $\overline{B}$ drive signals are proportional to the input voltage from the DC voltage source $V_{DC}$ and are therefore susceptible to input voltage ripple. As noted above however the capacitor C3 compensates for nonlinearity in the drive signals B and $\overline{B}$.

Inasmuch as the amplitude of the inverter output voltage $E_{out}$ is strictly proportional to the reference voltage $E_{ref}$, any modulation of input voltage is not transferred to the inverter output voltage $E_{out}$ providing the B and $\overline{B}$ drive levels are maintained greater than the peak values of the desired inverter output waveform $E_{ref}$, thus ensuring that neither $\Delta V2$ nor $\Delta V2$ becomes zero.

The control circuit 20 responds to variation in inverter output voltage $E_{out}$ resulting from transformer regulation, output filter regulation, input voltage modulation, etc., by modifying the pulse widths of the pulses generated by the inverter power switches Q1, Q2, Q3 and Q4 to force the inverter output waveform $E_{out}$ to approximate the reference voltage waveform $E_{ref}$. The inverter power circuit will be forced to duplicate the reference voltage $E_{ref}$ which is usually sinusoidal but can be other with a degree of accuracy which can be controlled by the amount of feedback to terminal PT, the inverter design, and the selection of R1, R2 and C3.

The transient response provided by the control circuit 20 is superior to state of the art schemes in that it immediately compensates the inverter pulse widths to correct optimally for transformer and/or output filter regulation as well as for changes in the input voltage from source $V_{DC}$.

This concept of controlling pulse-width-modulated inverters can be extended to three phase arrangements merely by employing redundant control circuits for each phase and utilizing a three-phase reference voltage source. This will result in a three-phase inverter which provides individual phase voltage regulation and phase displacement control that is not affected by unbalanced phase loads.

Figure 4:
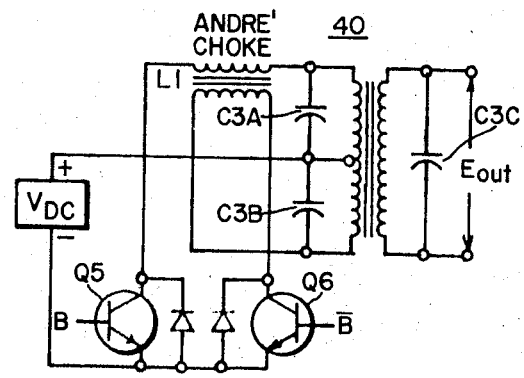
FIG. 4 is a schematic illustration of an alternate inverter arrangement similar to that shown in FIG. 1.

In FIG. 4 there is illustrated an alternate inverter power stage 40, generally described as a center tap power stage. Since the polarity reversals between B and $\overline{B}$ are made at a relatively high frequency, and the current is relatively large, the coupling between the two branches of the center tap power stage is critical. A special type of André choke L2 is used, which is wound with bifilar Litzendraht wire that achieves very close capacitive coupling with distributed capacitance through the choke windings. The combination of the high-frequency André choke and the utilization of capacitors C3A and C3B across the inputs of the center tap power circuit permits high-frequency switching of the power switches Q5 and Q6 without output distortion.

The use of the round bifilar wire in place of the flat foil commonly used, the capacitance between the two coils of the André choke exhibits a lesser amount of capacitance due to the limited contacting surfaces of adjacent coils. This reduces substantially the capacitance at the terminals of the choke which could destroy the power switching devices due to the large surge current that would be produced when the power switching device is activated.

The chokes used in either power circuit 10 or power circuit 40 are of a "swinging" type in which the inductance is reduced by the fundamental frequency of the output current. The "-swinging" choke improves efficiently at light loads and minimizes losses in the running standby condition.

The derivation of the current change in the filter capacitor C1 could be accomplished through the use of a resistor in place of the inductors of the current transformer CT. The lack of resistive burden in the current transformer provides a nonlinear effect which provides a rate of change selectivity which results in increased impedance burden for increased rate of current change, i.e., the greater the rate of current change the greater the impedance burden. This provides anticipatory response which is proportional to the rate of change of current.

Figure 5:
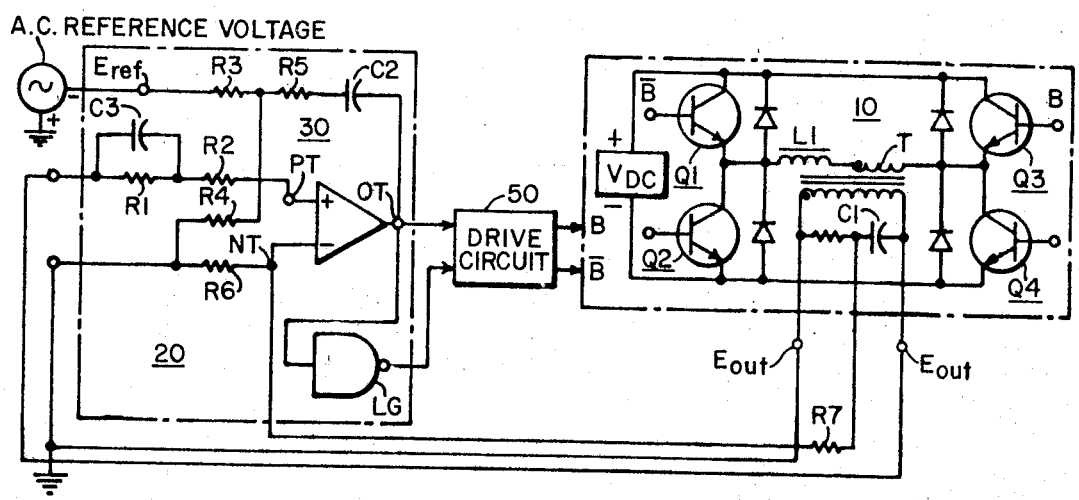
FIG. 5 is an alternate schematic illustration of method for monitoring change in output current of the inverter of FIG. 1.

The use of a resistor R10 in place of the current transformer is illustrated schematically in FIG. 5. The resistor lacks the frequency sensitivity and the inductive "flyback" of the current transformer which eliminates the requirement for the synchronous demodulator circuit 60. Therefore it is apparent that if frequency sensitivity is not required the implementation of a feedback circuit for introducing anticipation of change in output voltage by monitoring changes in output current can be accomplished through the use of current-sensing resistor R10 and comparator input resistor R7.

We claim:

1. In power inverter apparatus for converting DC input voltage into AC output voltage, the combination comprising, conduction-controlled switching means operatively connected between a source of said DC input voltage and an inverter output power transformer, control circuit means operatively connected to said conduction-controlled switching means to control the conduction of said switching means to develop said AC output voltage waveform at said output power transformer, the operation of said control circuit means being a function of said AC output voltage, and an anticipatory feedback circuit means operatively connected between said output power transformer and said control circuit means to supply a control signal to said control circuit means which is indicative of a change in output power transformer current with respect to time.

2. In power inverter apparatus as claimed in claim 1 including a filter capacitor connected across the output terminals of said output power transformer, said anticipatory feedback circuit means including a current responsive means connected in series with said filter capacitor.

3. In power inverter apparatus as claimed in claim 2 wherein said current responsive means is a resistor.

4. In power inverter apparatus as claimed in claim 2 wherein said current-responsive means is a current transformer.

5. In power inverter apparatus as claimed in claim 1 wherein said control circuit means generates signals to control the conduction of said switching means to maintain said AC output voltage within predetermined limits of an AC reference waveform, the control signal of said anticipatory feedback control circuit providing said control circuit means with an indication of impending changes in said AC output voltage.

* * * * *